Aug. 19, 1952     L. E. BRUOIT     2,607,303
METHOD AND APPARATUS FOR MANUFACTURING CONFECTIONS
Filed May 9, 1951     6 Sheets-Sheet 1
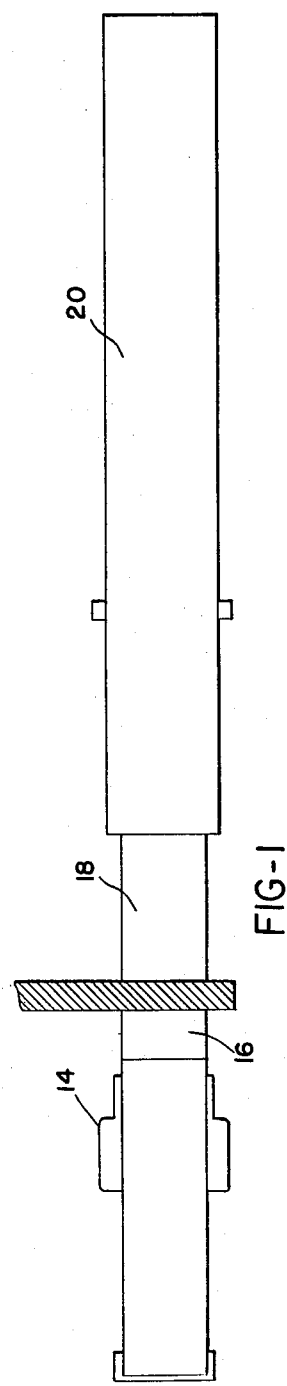
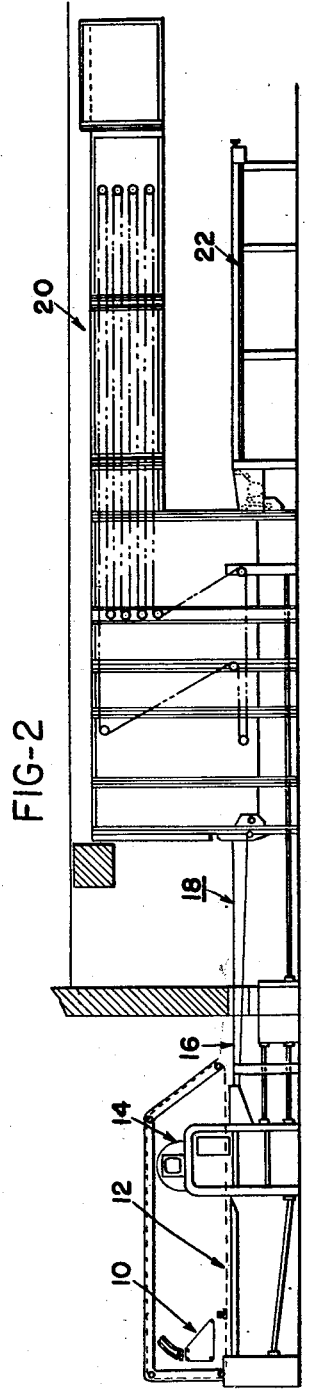
INVENTOR
LOUIS E. BRUOIT
BY *Toulmin & Toulmin*
ATTORNEYS Aug. 19, 1952     L. E. BRUOIT     2,607,303
METHOD AND APPARATUS FOR MANUFACTURING CONFECTIONS
Filed May 9, 1951     6 Sheets-Sheet 2
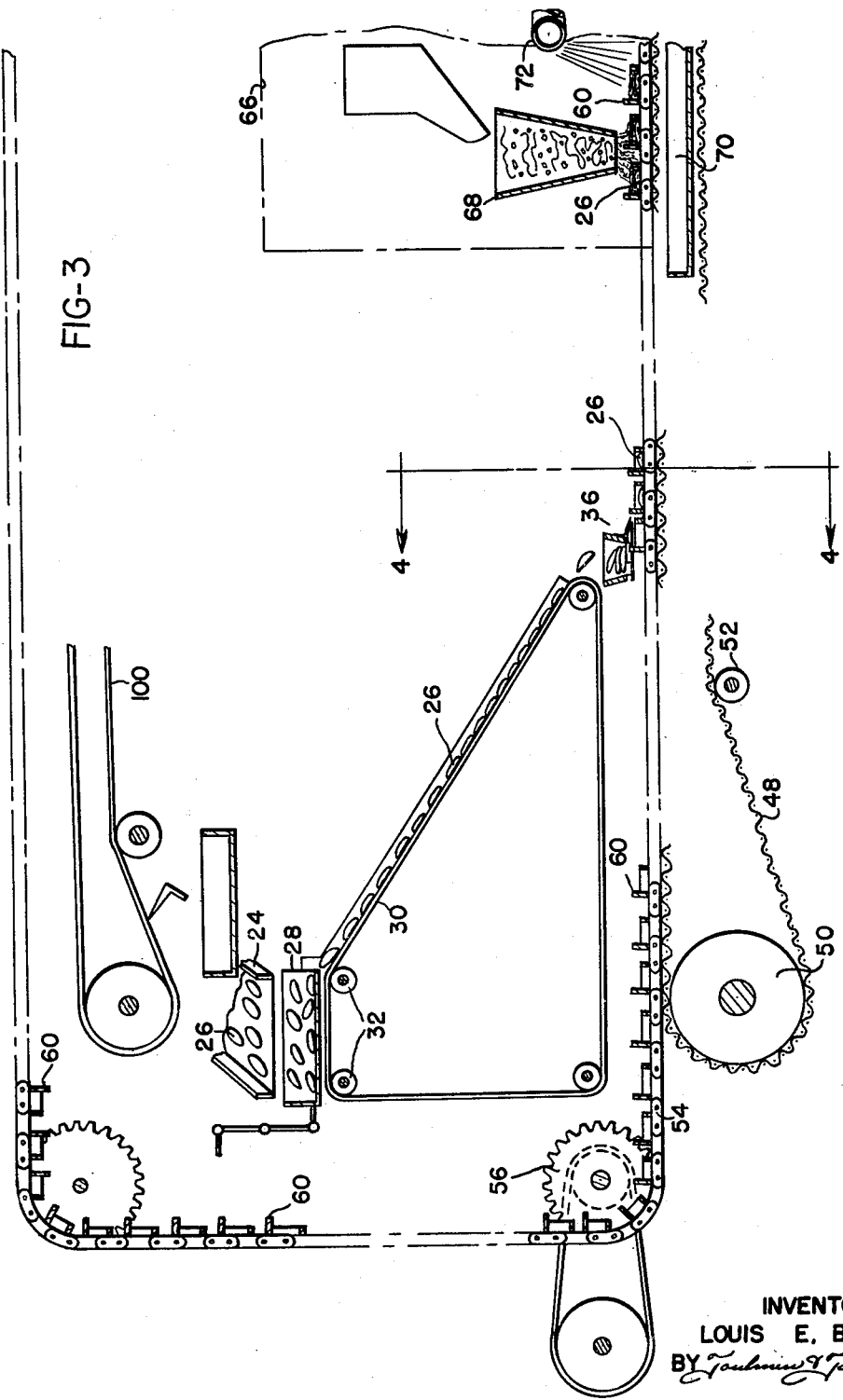
INVENTOR
LOUIS E. BRUOIT
ATTORNEYS

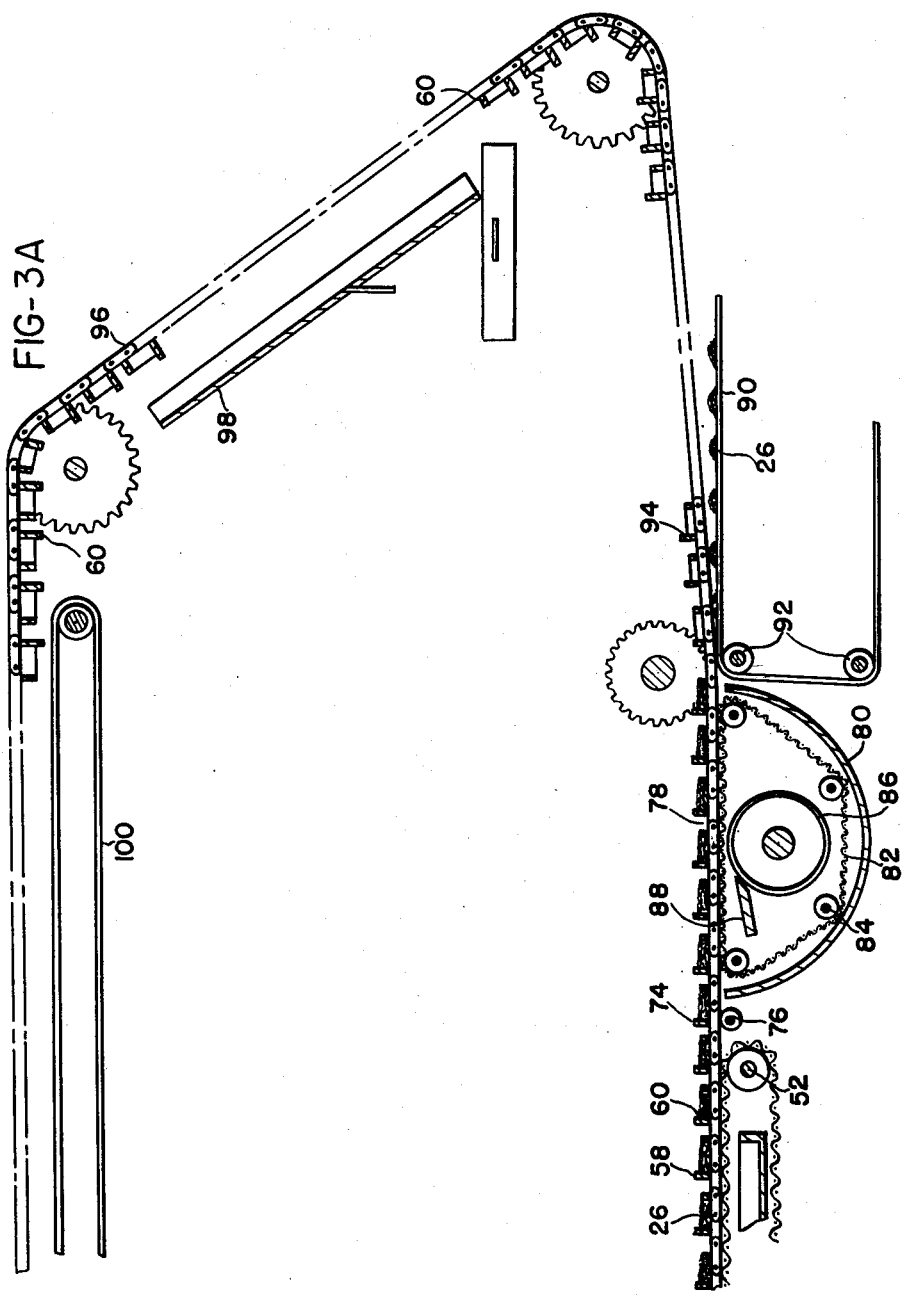

Aug. 19, 1952 L. E. BRUOIT 2,607,303
METHOD AND APPARATUS FOR MANUFACTURING CONFECTIONS
Filed May 9, 1951 6 Sheets-Sheet 4
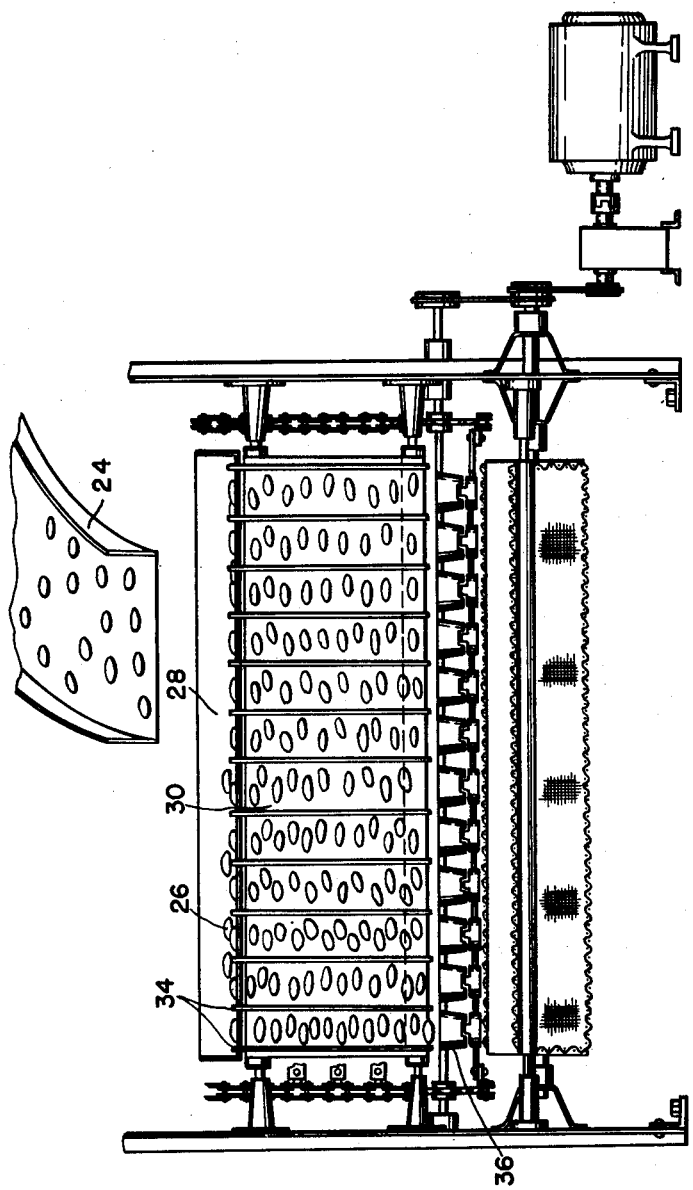
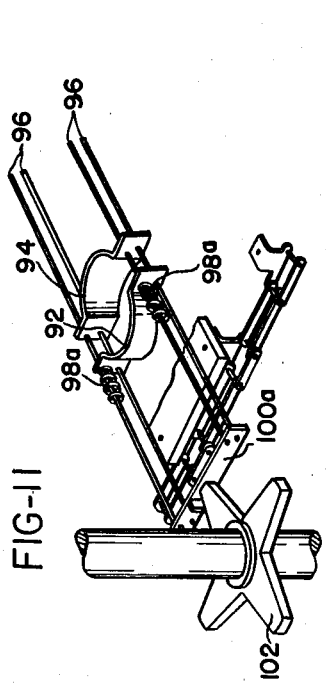
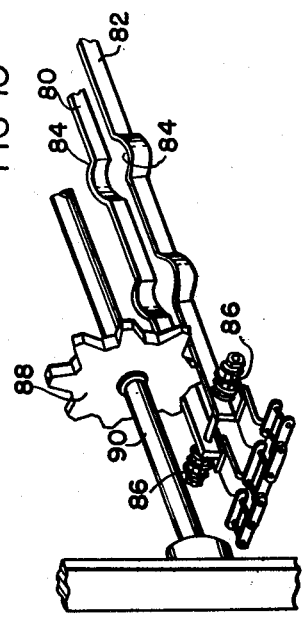
INVENTOR
LOUIS E. BRUOIT
BY *Toulmin & Toulmin*
ATTORNEYS Aug. 19, 1952 L. E. BRUOIT 2,607,303
METHOD AND APPARATUS FOR MANUFACTURING CONFECTIONS
Filed May 9, 1951 6 Sheets-Sheet 5

INVENTOR
LOUIS E. BRUOIT
BY Toulmin & Toulmin
ATTORNEYS

Aug. 19, 1952 L. E. BRUOIT 2,607,303
METHOD AND APPARATUS FOR MANUFACTURING CONFECTIONS
Filed May 9, 1951 6 Sheets-Sheet 6
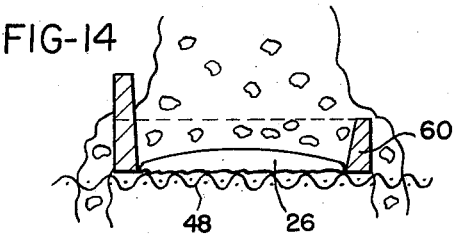
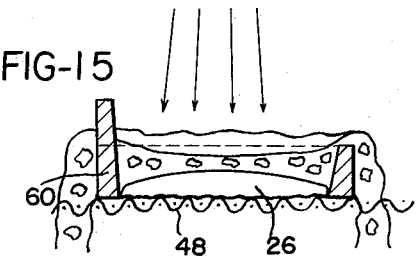
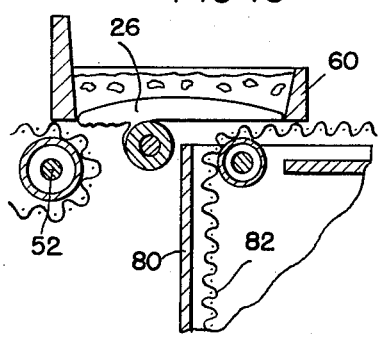
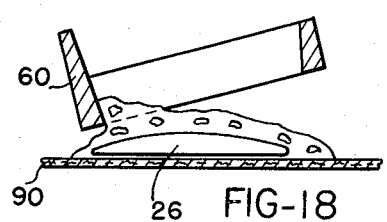
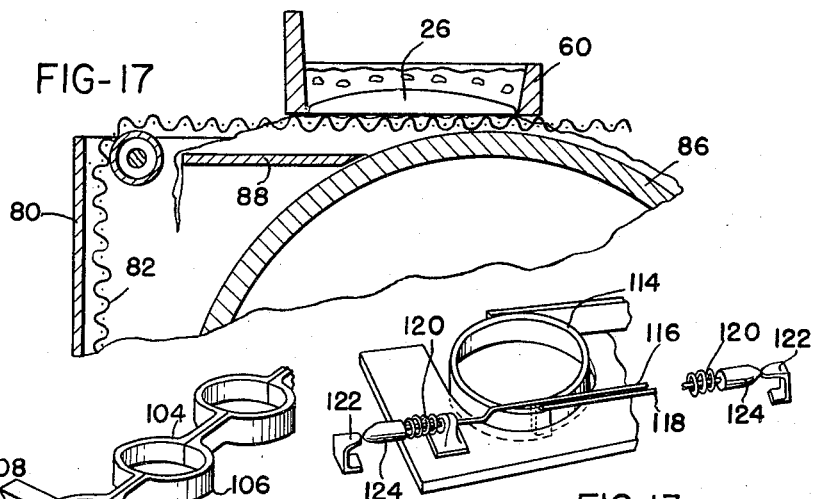
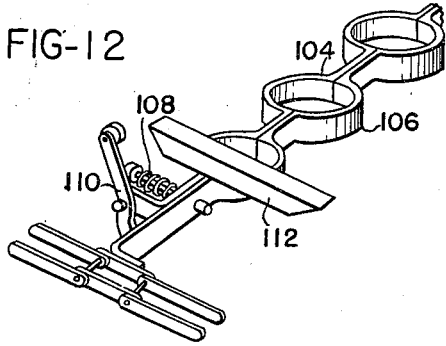
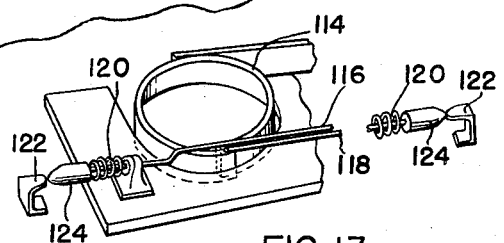
INVENTOR
LOUIS E. BRUOIT
BY Toulmin & Toulmin
ATTORNEYS Patented Aug. 19, 1952

2,607,303

UNITED STATES PATENT OFFICE 2,607,303

METHOD AND APPARATUS FOR MANUFACTURING CONFECTIONS

Louis E. Bruoit, Fort Wayne, Ind., assignor to Wayne Candies, Inc., Fort Wayne, Ind., a corporation of Indiana Application May 9, 1951, Serial No. 225,317

20 Claims. (Cl. 107—54)

This invention relates to a method and apparatus for manufacturing confections, particularly coated confections, such as peanut patties and the like.

A usual kind of confection is one in which there is a center that may consist of cream or fondant, and over which there is a layer of chocolate or similar covering material. One of the most widely produced confections of this nature is a peanut patty which consists of a cream center that is enrobed in chocolate and peanuts. In the manufacture of peanut patties particular problems arise, and it is in connection with these problems that the present invention deals.

Heretofore, the usual manner of manufacturing peanut patties involved the hand dipping of the confection in chocolate at at least one stage during the process of manufacture. An operation of this sort is, of course, undesirable because of the possibility of unsanitary conditions arising, and also because of the labor involved and the length of time that is naturally required for carrying out a hand operation.

The usual procedure in the production of peanut patties involves the coating or enrobing of the center with a first layer of chocolate, then the application of the nuts, and then a final enrobing operation in order to cover the nuts with a layer of chocolate. It will be evident that this method of covering the center requires three separate and distinct steps and is, accordingly, somewhat slow and involved.

Another method that it has been attempted to employ enrobes the centers in chocolate and then drops the enrobed confections on a layer of nuts, so the nuts will adhere to the coating before the coating is completely set up. With this method of manufacture, the manual step of applying the nuts to the confection or dipping the confection is eliminated, but, unless a second enrobing step is employed, the nuts will not be completely covered with the chocolate, and, unless they are so covered, the confection is much less attractive in appearance, and the possibility exists that the nuts will become dislodged from the chocolate in the handling of the confection during packaging, shipping, etc.

Having the foregoing in mind, the primary object of the present invention is the provision of a method and apparatus especially adapted for producing confections comprising a center that is enrobed with nuts, such as peanuts, and a candy coating, such as chocolate or butterscotch, or the like.

Another object is the provision of a method and apparatus for producing peanut patties which is entirely automatic and in which hand labor is eliminated.

A still further object is the provision of a method and apparatus for producing peanut patties wherein the minimum number of steps are required to produce the finished confection.

Another object is the provision of a method and apparatus for producing coated confections, such as peanut patties and the like, in which the product is substantially uniform as to size and configuration.

These and other objects and advantages will become more apparent upon reference to the following description taken in connection with the accompanying drawings, in which:

Figure 1 is a diagrammatic plan view of an apparatus for manufacturing candy in accordance with this invention;

Figure 2 is a side elevation of the machine illustrated in Figure 1, showing more in detail the arrangement of the various parts of the machine;

Figures 3 and 3A show the coating section of the machine of Figures 1 and 2 at a somewhat larger scale;

Figure 4 is a transverse section indicated on line 4—4 of Figure 3 showing the arrangement for feeding the centers of the confections to a conveyor on which they are conveyed through the enrobing station of the machine;

Figure 10 is a view showing an expansible ring which opens at the time the centers are fed thereto so the centers will drop to their proper positions in the rings;

Figures 11, 12 and 13 are perspective views showing modified arrangements of the expansible ring of Figure 10;

Figure 14 is a sectional view showing the step of initially enrobing the center in a mixture of chocolate and peanuts;

Figure 15 is a view showing the next step in the cycle of operations in the preparation of the peanut patty, and which consists of directing an air blast downwardly on the enrobed center to blow some of the coating therefrom;

Figure 16 shows the next following step in the cycle of operations which consists of stripping the bottom of the enrobed center;

Figure 17 shows the next following step in the production of the confection and which consists of coating the bottom of the confection with a layer of chocolate; and Figure 18 shows the final step in the manufacture of the confection, and which consists of removing the ring therefrom so that there remains on the conveyor only the enrobed center forming the confection proper.

Figure 6:
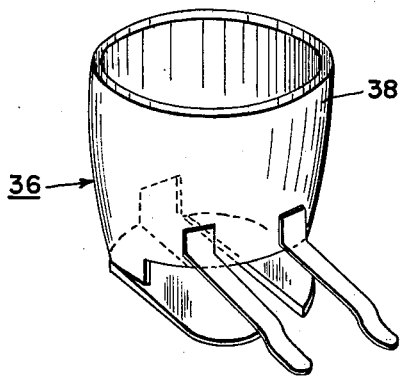
Figures 6 and 7 are perspective views showing a hopper in which the centers are retained before they are fed into the rings.

In general, a machine of the type with which this invention is concerned comprises an arrangement for feeding centers to a conveyor and the centers are then carried by the conveyor through an enrobing station, where they are coated with a layer of chocolate or similar material. Thereafter, the confections are passed through a cooler and are then ready for wrapping and packaging.

In Figures 1 and 2 the center feeding portion of the machine is generally indicated at 10, the conveyor to which the centers are delivered from the feeding arrangement is indicated at 12, and the enrober which coats the centers is shown at 14.

After the coated centers leave the enrober, they are transferred to a conveyor mechanism at 16 on which they pass through what is known as a decorating space 18, and in which space the confections are inspected and decorated, if this is desired.

After the confections pass through the decorating space 18 they are then conveyed through a multiple pass cooler 20, and are then finally delivered to a packaging station 22, where they may be wrapped and boxed by automatic equipment.

The portion of the manufacturing apparatus with which this invention is most particularly concerned is illustrated in Figures 3 and 4. In these figures there will be seen a delivery chute 24 down which the centers 26 are fed to the center feeding device. These centers are generally disk-like articles of the usual cream or fondant, and are produced in a conventional manner, as, for example, by molding in cornstarch molds.

The centers 26 pass from the chute 24 to a distributor 28, and from there to a belt 30 supported on rollers 32 and driven by any suitable means so as to advance the centers down the belt toward the point where they will be transferred to the main conveyor of the machine. As will be noted in Figure 4, the inclined portion of belt 30 may be divided by a plurality of divider members 34, so the centers 26 will advance down the incline of the belt in rows.

Along the lower edge of the inclined portion of belt 30 there is a series of hoppers 36, one in alignment with each of the spaces provided by the above-mentioned divider members 34. There hoppers are adapted for receiving and retaining the centers in stacked relation therein.

Figure 7:
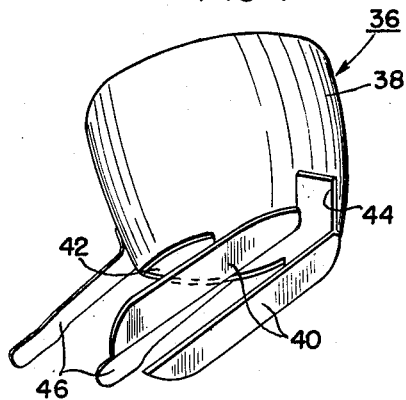

The exact nature of the hoppers referred to will be more apparent upon reference to Figures 6 and 7, wherein it will be seen that the hoppers comprise the generally cylindrical upper part 38 that may taper somewhat, as illustrated, so the centers will fall readily therein at the upper end, but will be delivered from a fixed location at the lower end.

The lower end of the hopper is arranged to support the centers by means of the two longitudinally extending strips 40 which project outwardly beyond the front edge of the hopper. The front edge of the hopper is notched, as at 42, so the centers can be fed one at a time from the hopper by sliding them along the strips 40.

For a purpose which will become more apparent hereinafter, a relatively small notch 44 is provided in the back of each hopper between the strips 40. Each hopper is also provided with a pair of spring fingers 46 extending out from the front thereof and above the strips 40 to a point substantially forwardly of the outer ends of the said strips.

Returning now to Figures 3 and 4, there extends beneath the row of hoppers 36 a conveyor belt 48 that is preferably a wire mesh belt of some sort having apertures therein on the order of about one-half inch across their smallest dimension. In practice, I have found a satisfactory wire belt to consist of transversely extending strips spaced about a half inch apart longitudinally of the belt and interconnected by longitudinally extending wires spaced about two inches apart. This conveyor belt is supported by the main drive roll 50 and idler rolls 52, with the main drive roll being driven in any suitable and well-known manner.

On each side of the machine and outwardly of the edges of belt 30 and conveyor 48 is a chain 54. Chains 54 are supported, as best seen in Figure 3, by sprockets 56, and one of which may be driven in any suitable manner, preferably synchronously with the driving of drive roll 50 for conveyor 48.

Extending between the chains 54 is a plurality of units, generally designated 58, and each of which consists of a plurality of individual rings 60 connected together by bars extending therebetween, and also connected to the chains. As will be seen in Figure 3, there may be an uninterrupted series of units 58 connected between the chains 54 so that when the chains are driven, this series of units will be conveyed beneath the hoppers 36 for receiving centers therefrom in a manner which will now be described.

Figure 5:
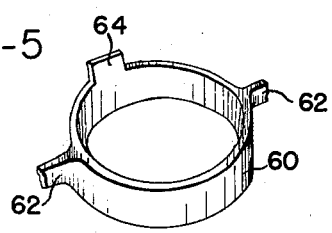
Figure 5 is a perspective view showing one of the rings into which the centers are fed to be conveyed through the coating station.

In Figure 5 there is shown in perspective one of the ring members 60. In this view there will be seen the bars 62 extending out opposite sides of the ring, and by means of which it is integrally connected with the adjacent rings on each side. Upstanding from the back edge of ring 60 is a finger or lug 64 of a size which will freely pass through the previously referred to notch 44 in the back of the hopper. The interaction of each ring 60 and its associated hopper will be seen in Figures 8 and 9.

In these figures it will be noted that the ring is so positioned that the annular part of the ring will pass beneath the strips 40 of the hopper, while the finger or lug 64 of the ring will extend upwardly beyond the upper edges of the strips 40 so as to engage the back edge of the lowermost one of the centers 26 in the hopper.

Figure 8:
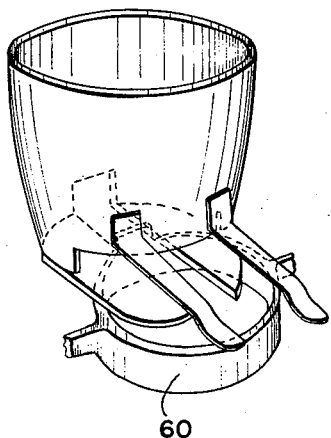
Figures 8 and 9 are prespective views showing how the rings and hoppers cooperate in the feeding of the centers from the hoppers into the rings.
Figure 9:
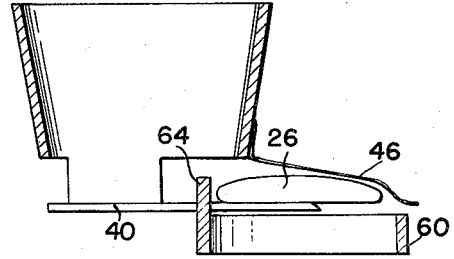

Finger or lug 64 does not extend higher than the top of the lowermost one of the centers, and thus, as the ring moves beneath the hopper, as indicated in Figures 8 and 9, the lowermost center is fed horizontally from the hopper out over the ends of the strips 40 so as to drop into the ring 60.

In a subsequent operation the centers are enrobed with a heated confection which flows rather readily in its heated state, and because of this each center must be a fairly close fit in its ring or the material with which it is to be enrobed will drain through the bottom of the ring around the center and leave an insufficient amount about the center to produce a proper product. For this reason, I have found it of advantage to provide the spring fingers 46 which bear downwardly on top of the centers and serve to force them downwardly into the rings into proper sealing engagement therewith.

After the rings have passed beneath the hoppers and received the centers in the manner described, they pass through the enrobing station 66, which comprises a hopper 68 to which is fed a mixture of chocolate and peanuts. This mixture is heated and thus is readily flowable from the hopper down over the rings having the centers therein. There is preferably provided means whereby there is a continuous supply of heated chocolate and peanuts to the hopper, and the excess thereof over what will be retained in the rings over the centers flows downwardly around the outsides of the rings and through the conveyor 48 to a tray or catch basin 70, whence it is returned to any convenient sort of sump or reservoir and recirculated.

Inasmuch as the mixture of chocolate and peanuts is relatively viscous, it is desirable to provide some means for adjusting the amount thereof that is associated with each center, so that a product relatively uniform in size can be produced. I have found it convenient and effective to accomplish this by providing a blast pipe 72 positioned toward the exit side of hopper 68 and which directs an air blast downwardly toward the tops of the rings. This air blast can be adjusted as to intensity at any point along its length, and, in this manner, is effective for dislodging excess coating material from the rings that have been oversupplied, thereby insuring that all of the confections will be perfectly uniform.

After a further travel on conveyor 48, the rings and centers pass over a station at 74, the purpose of which is to strip the bottoms of the confections clean of chocolate and any small particles of nuts and the like that may have adhered thereto. This is accomplished by a relatively small roll 76 bearing on the bottoms of the rings and rotating relatively rapidly in a counterclockwise direction as it is viewed in Figure 3. It is to be noted that this roll is positioned immediately beyond the end of conveyor 48, and that, inasmuch as it bears directly on the bottoms of the rings, it will strip the bottoms of the rings and the centers absolutely clean of all material.

Immediately to the right of the bottoming roll 76 there is a bottoming station 78 consisting of a tank or sump 80 within which is located a conveyor wire 82 passing around supporting rolls 84. Conveyor wire 82 is preferably of a finer mesh than conveyor wire 48, and I have found a satisfactory mesh for this purpose to be about one-fourth inch by two inches.

The sump 80 contains a quantity of chocolate free of peanuts, and into this chocolate there dips a feed roll 86 that is driven in a counterclockwise direction. This feed roll 86 picks up chocolate from the sump and carries it upwardly so that it floods out over the plate 88 positioned close to the upper part of roll 86 and somewhat beneath conveyor wire 82. This action results in the flooding up through the conveyor wire of the chocolate, and in this manner the bottoms of the confections are completely covered with a layer of chocolate free of peanuts.

Immediately to the right of the bottoming station, as viewed in Figure 3, there is a conveyor apron 90 supported on rolls 92. This apron is formed of a plastic material or the like, and may be continuous, or may consist of a series of relatively short lengths which can be separately transported through the multiple pass cooler referred to previously.

The confections are transferred to conveyor 90 by causing chains 54 to move upwardly, as will be seen at 94, so that the rings are lifted upwardly and permit the centers to slip through the bottoms thereof and be deposited on conveyor 90. After the confections are removed from the rings by the upward travel of the chains and ring units, the chains and units pass around their return path 96 to their place of beginning beneath belt 30. During this return travel means may be provided such as the tray 98 and drip apron 100 for catching and saving any chocolate that might drip from the ring units at that time.

The foregoing steps in the process of manufacturing a confection according to this invention are illustrated at somewhat enlarged scale in Figures 14 through 17.

In Figure 14 there is shown the step of enrobing the center with the chocolate and peanuts, and it will be observed that there is an excess of the enrobing material supplied so that there is a flow of the said material over the top of the ring and down through the wire conveyor belt.

In Figure 15 there is shown the action that takes place when the rings pass beneath the air blast station. This figure indicates that a certain amount of the enrobing material is displaced from the ring, and by regulating the air blast, the amount of material remaining within the ring to form the final coating on the center can be closely controlled.

In Figure 16 the step of stripping the bottom of the confection is illustrated, and it will be seen how the bottoming roll engages the bottom of the confection and strips therefrom the overflow of chocolate, together with nut particles or the like that may be adhering to the bottom of the candy.

In Figure 17 the step of applying the chocolate to the bottom of the confection is illustrated and the manner in which the chocolate floods across the plate and up through the wire conveyor belt to form the coating of pure chocolate will clearly be seen.

In Figure 18 the confection and ring are shown in the act of separating, and it will be observed that the coating material flows out about the center when the ring is lifted. The coating at this point in the process still has sufficient viscosity to flow out to form the usual configuration that peanut patties take, but is not so thin as to flow completely from the center, as would occur if the ring were separated from the center at an earlier stage of the process.

It has been mentioned before that the centers must be a fairly close fit in the rings to prevent the enrobing material from running out the bottom of the ring about the center. Because of the necessity for this relatively close fit, certain difficulties are encountered in properly placing the centers in the rings. The centers themselves are not held to any critical tolerances, and certain ones thereof will not fall down into the rings properly, but must be pressed down to get them into the proper position. As has been explained, spring fingers 46 may be provided for this purpose, but other arrangements may be employed, and some thereof are illustrated in Figures 10 through 13.

In general, the arrangements shown in Figures 10 through 13 comprise means for expanding the rings so they can receive the centers and are then closed so they can form an enclosure about the centers. Optionally, the rings may also be opened to release the centers, should any difficulty be encountered in the confections dropping from the rings, as in Figure 18.

In Figure 10 the ring assembly comprises the two halves 80 and 82 which form the rings by means of the bent-out parts at 84. The two parts 80 and 82 are sprung toward each other by the springs 86 and are adapted for being separated at the time the centers are fed thereto, as by means of the toothed wheel 88 rotatably mounted by shaft 90 so as to present a tooth between the parts 80 and 82 of each ring unit as it passes beneath the said hoppers.

In Figure 11 a somewhat similar arrangement is shown, except that the ring units comprise a plurality of ring halves, as shown at 92 and 94, mounted on the rods 96 and sprung toward each other by springs 98a. One pair of rods 96 is connected to one of the ring halves, and the other set to the other ring half, and one pair of the rods is connected by plate 100a, as shown in the drawing, and the other pair is connected at the opposite side of the machine by another plate. The rings are adapted for being opened by an actuator member 102 rotatably mounted at each side of the machine and synchronized with the movement of the ring units so as to open the rings at the proper time.

In Figure 12 an arrangement similar to that shown in Figure 10 is illustrated wherein the rings are made up into separable halves 104 and 106. The half 106 is secured to the chains and the half 104 is sprung toward half 106 by springs 108. A lever 110 is pivoted to one of the ring halves and is adapted to bear on the other ring half for separating the said halves when actuated by a fixed cam 112.

In Figure 13 there is illustrated a ring comprising flexible band 114 that is normally in its closed position. The two ends of the band are connected to the rods 116 and 118 which may be sprung toward the closed position of the rings by the springs 120. The rings are adapted for being opened by the cams 122 on opposite sides of the machine which engage the elements 124 on the ends of the rods 116 and 118 at the point in the travel of the rings that it is desired for them to be expanded.

It will be understood that this invention is susceptible to modification in order to adapt it to different usages and conditions, and, accordingly, it is desired to comprehend such modifications within this invention as may fall within the scope of the appended claims.

I claim:

1. In a machine for making coated confections; circular ring means open top and bottom and movable in a substantially horizontal direction, a feeder for supplying circular candy centers to said ring means, said centers fitting closely in said ring means, an enrober spaced from said feeder for supplying melted coating material to said ring means from above, a wire belt beneath said ring means and movable therewith for supporting the centers in the ring means during the enrobing operation, said belt terminating beyond said enrober, driven roll means adjacent the end of said belt for engaging and stripping the bottoms of said centers clean, and means for moving said rings vertically relative to the centers after the stripping operation for releasing the centers and the coating material from the rings.

2. In a machine for making coated confections; a plurality of ring means open top and bottom and movable in a substantially horizontal direction, a feeding mechanism operable to feed candy centers to said ring means, an enrober spaced from said feeding mechanism for supplying melted coating material to said ring means, a wire belt beneath said ring means movable therewith and extending from said feeding mechanism to a point beyond said enrober for supporting the centers in the rings, a bottoming roll positioned beyond the end of said wire belt engaging the bottoms of said rings and centers and driven for stripping the bottoms of the centers clean, means for supplying melted coating material to the bottoms of said centers after they pass beyond said bottoming roll, and means for lifting the ring means upwardly to release the centers and coating material therefrom.

3. In a machine for making coated confections; a pair of spaced endless chains, a plurality of elements extending transversely between said chains and connected therewith and each comprising a series of rings open top and bottom, a feeder operable to feed candy centers into said rings during movement of said chains and rings, an enrober for supplying melted coating material to said rings, a wire belt extending along immediately beneath said rings from the feeder to a point beyond said enrober for supporting the centers in said rings, a rotary bottoming roll engaging the bottoms of said rings immediately beyond the end of said wire belt, a second wire belt extending beneath the rings and movable therewith beyond said bottoming roll, means for flooding melted confection upwardly through said second wire belt to coat the bottoms of said centers, means for moving the rings upwardly at an angle to release the centers and coating material therefrom, and an imperforate conveyor means for receiving the released centers.

4. In a machine for making coated confections; a frame, a pair of spaced endless chains mounted in said frame, a plurality of elements extending between and connected with said chains and each comprising a series of rings open top and bottom, said chains including a lower flight consisting of a horizontal portion and an upwardly inclined portion extending from the end of said horizontal portion, a first wire belt extending beneath said rings along the first part of said horizontal portion, a second wire belt extending along beneath said rings along another part of said horizontal portion, an imperforate conveyor member extending along beneath said inclined portion, means for feeding centers into said rings and for supplying melted coating material thereto over said first wire belt, a bottoming roll between said wire belts engaging the bottoms of said rings and the centers therein and driven in rotation so as to strip the bottoms of said centers clean, means for flooding melted confection upwardly through said second wire belt to coat the bottoms of said centers, and means for controlling the amount of coating material supplied to said rings.

5. In a machine for making coated confections; a hopper adapted for receiving circular candy centers in stacked relation, circular ring means movable beneath said hopper and each operable for dislodging the lowermost one of the said centers from the hopper so the said centers are deposited in the said ring means, said centers fitting said ring means closely, an enrober for supplying a mixture of melted chocolate and peanuts to the rings from above after they have received the centers, a supporting wire belt immediately beneath said ring means and movable therewith for supporting the centers therein until after the enrobing operation, a driven roll adjacent the end of said wire belt to engage and strip the bottoms of the centers after the enrobing operation, said wire belt terminating beyond the enrober, means for lifting the ring means upwardly after the stripping operation to release the centers and coating material therefrom, and a moving imperforate conveyor member for receiving the released centers.

6. In a machine for making coated confections; a hopper adapted for receiving circular candy centers in stacked relation, ring means forming a close fit about the centers movable beneath said hopper and each operable for dislodging the lowermost one of the said centers from the hopper so the said centers are deposited in the said ring means, an enrober for supplying a mixture of melted chocolate and peanuts to the rings from above after they have received the centers, an air blast directed downwardly toward the tops of said rings immediately behind said enrober for controlling the amount of coating material retained in said rings, a supporting wire belt immediately beneath said ring means and movable therewith for supporting the centers therein until after the enrobing operation, a driven roll to engage and strip clean the bottoms of the centers after the enrobing operation, means to supply melted confection to the stripped bottoms of the centers, means for lifting the ring means upwardly after the last-mentioned operation to release the centers and coating material therefrom, and a moving imperforate conveyor member for receiving the released centers.

7. In a machine of the character described; a hopper adapted for receiving and supporting candy centers in stacked relation, an annular ring of a size closely to receive one of said centers adapted for passing beneath the lower end of said hopper, a lug upstanding from the rear side of said ring adapted to engage the lowermost one of said stacked centers and to push it from said hopper for depositing in said ring, and means for supplying melted confection to the ring after the center has been fed therein.

8. In a machine of the character described; a generally cylindrical hopper open at the top and having inwardly extending edge parts at the bottom for supporting candy centers placed in the hopper in stacked relation, an annular ring of a size closely to receive one of said centers adapted for being passed beneath said hopper, a lug upstanding from the rear edge of said ring to engage the lowermost one of said centers to feed it from said hopper, whereupon it will drop into the said ring, said hopper being notched at the bottom in back to receive said lug and having an opening at the bottom in front for permitting the fed center to pass therethrough, and means for supplying melted confection to said ring after the center has been deposited therein.

9. In a machine of the character described; a generally cylindrical hopper open at the top and having a pair of spaced strips extending along the bottom so that candy centers placed in said hopper on said strips will be supported in stacked relation, said strips extending forwardly from the front side of said hopper, an annular ring of a size closely to receive one of said centers adapted for passing beneath said hopper, a lug upstanding from the rear edge of said ring for engaging the lowermost one of said centers for feeding it from said hopper and out past the ends of said strips, said hopper being notched at the bottom in the rear to receive said lug and having an opening at the bottom in front for passing the lowermost or fed center from the hopper while retaining the remainder of the centers in the hopper, and means for supplying melted confection to said ring after the center has been deposited therein.

10. In a machine of the character described: a generally cylindrical hopper open at the top and having a pair of spaced strips extending along the bottom so that candy centers can be supported in said hopper on said strips in stacked relation, said strips extending forwardly from the front side of said hopper, a ring adapted for passing beneath said hopper, a lug upstanding from the rear edge of said ring for engaging the lowermost one of said centers for feeding it from said hopper and out past the ends of said strips, the lower edge of said hopper being notched in back to receive said lug and having an opening in the front for passing the fed centers, spring fingers extending out over said strips and beyond the ends thereof for urging the fed centers downwardly into the ring when the said centers move off the ends of said strips, and means for supplying melted confection to said ring after the center has been deposited therein.

11. In a candy making machine; a plurality of hoppers in side-by-side relation open top and bottom, laterally spaced strips on the bottom of each hopper to support circular candy centers stacked therein, a feeder to feed centers into the tops of the hoppers, annular rings of a size closely to receive said centers movable to beneath the hoppers and each having a feed lug upstanding from its rear edge to engage and feed the lowermost center from the associated hopper into the ring when the ring is passed beneath the hopper, means for forcing the fed centers into the rings, and means for supplying melted confection to said rings after the centers have been deposited therein.

12. The method of making enrobed confections consisting of a center and surrounding coating material comprising: placing a ring about the center in peripheral engagement with the center and upstanding thereabout, supplying melted coating material heated to the point of being thinly fluid to the ring above the center, cooling the melted coating material until it becomes viscous and slow flowing, and lifting the ring from the center before the coating material solidifies.

13. The method of making enrobed confections consisting of a center and surrounding coating material comprising: placing a ring about the center in peripheral engagement with the center and upstanding thereabout, supplying melted coating material heated to the point of being thinly fluid to the ring above the center, directing an air blast down on top of the melted coating material in the ring to displace some thereof and thus regulate the amount of coating material associated with the center, allowing the coating material to cool to the point of high viscosity and slow flowability, and lifting the ring from the center before the coating material solidifies.

14. The method of making enrobed confections consisting of a center and surrounding coating material comprising: placing a ring about the center in peripheral engagement with the center and upstanding thereabout, supplying melted confection to the ring above the center, stripping the bottom of the center clean, supplying further melted confection to the stripped bottom, and lifting the ring from the center before the connection solidifies.

15. The method of making enrobed confections consisting of a center and surrounding coating material comprising: placing a ring about the center in peripheral engagement with the center and upstanding thereabout, supplying melted confection to the ring above the center, directing an air blast down on top of the melted confection in the ring to displace some thereof and thus regulate the amount of confection associated with the center, stripping the bottom of the center clean, supplying further melted confection to the stripped bottom, and lifting the ring from the center before the confection solidifies.

16. In the manufacture of peanut patties, mixing melted chocolate and peanuts, supplying the mixture heated to the point of being thinly fluid to the tops of a candy center, supporting the mixture on top of the center until it cools to the point of commencing to thicken, placing the center on a planar imperforated supporting surface, and then releasing the support from the mixture so it flows around the periphery of the center while still maintaining a coating on the top of the center.

17. In the manufacture of peanut patties; mixing melted chocolate and peanuts, and maintaining the temperature of the mixture at a point where it is readily flowable, supplying the flowable mixture to the top of a candy center and supporting it thereon until its flowability is reduced due to the reduction in temperature thereof, placing the center on a planar imperforate supporting surface, and then removing the support from the mixture so it flows around the periphery of the center while still maintaining a coating on top of the center.

18. In the manufacture of peanut patties; moving candy centers horizontally, supplying a mixture of melted chocolate and peanuts to the tops of said centers with the mixture at a temperature at which it is readily flowable, supporting the mixture on top of the centers until the temperature of the mixture is reduced to the point that it commences to thicken, removing the support from the mixture so it flows about the peripheries of the centers while still maintaining a coating on the tops thereof, and stripping the bottoms of the centers clean and supplying melted chocolate free of peanuts to the stripped bottoms after the supplying of the mixture to the tops of the centers and before the said removing of the support.

19. An arrangement as called for in claim 1 in which the said ring means is expansible diametrally, and means are provided operable for expanding the ring means at the time of supplying centers thereto and for bringing about contraction of the ring means after the centers have been deposited therein.

20. An arrangement as called for in claim 1 in which the said ring means is composed of semi-circular halves spring urged toward each other, and means are provided for separating the said halves when the centers are fed to the ring means and for permitting said halves again to move together after the said centers have been deposited in the ring means.

LOUIS E. BRUOIT.

REFERENCES CITED

The following references are of record in the file of this patent:

UNITED STATES PATENTS

| Number | Name | Date |
|---|---|---|
| 1,673,686 | Kremmling | June 12, 1928 |
| 1,786,108 | Drury | Dec. 23, 1930 |
| 1,793,752 | Schuler | Feb. 24, 1931 |
| 2,002,018 | Martoccio | May 21, 1935 |
| 2,080,113 | Cloud | May 11, 1937 |